US010394967B2

(12) United States Patent
Deodhar et al.

(10) Patent No.: US 10,394,967 B2
(45) Date of Patent: Aug. 27, 2019

(54) METHOD AND APPARATUS FOR AUTOMATICALLY ASSEMBLING COMPONENTS IN A COMPUTER-AIDED DESIGN (CAD) ENVIRONMENT

(71) Applicants: Prashant Deodhar, Pune (IN); Sagar Inamdar, Pune (IN); Sandesh Kadam, Pune (IN); Sarang Kandekar, Pune (IN); Yogesh Kavte, Pune (IN); Maruthi Pavan, Pune (IN); Gaurav Sawant, Pune (IN); Ravi Vithalani, Pune (IN)

(72) Inventors: Prashant Deodhar, Pune (IN); Sagar Inamdar, Pune (IN); Sandesh Kadam, Pune (IN); Sarang Kandekar, Pune (IN); Yogesh Kavte, Pune (IN); Maruthi Pavan, Pune (IN); Gaurav Sawant, Pune (IN); Ravi Vithalani, Pune (IN)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 703 days.

(21) Appl. No.: 14/818,089

(22) Filed: Aug. 4, 2015

(65) Prior Publication Data

US 2016/0371397 A1 Dec. 22, 2016

(30) Foreign Application Priority Data

Jun. 18, 2015 (IN) .............................. 675/KOL/2015

(51) Int. Cl.
*G06F 17/50* (2006.01)
(52) U.S. Cl.
CPC .......... *G06F 17/50* (2013.01); *G06F 2217/02* (2013.01); *G06F 2217/06* (2013.01)

(58) Field of Classification Search
None
See application file for complete search history.

(56) References Cited

U.S. PATENT DOCUMENTS

| 6,219,049 B1 * | 4/2001 | Zuffante ................. G06F 17/50 345/420 |
| 6,725,184 B1 * | 4/2004 | Gadh ............... G05B 19/41805 703/2 |

(Continued)

FOREIGN PATENT DOCUMENTS

EP 2279477 A1 2/2011

OTHER PUBLICATIONS

Monjy Rabemanantsoa and Samuel Pierre, "An artificial intelligence approach for generating assembly sequences in CAD/CAM," Artificial Intelligence in Engineering, vol. 10, pp. 97-107 (1996).

(Continued)

*Primary Examiner* — Kibrom K Gebresilassie
*Assistant Examiner* — Cuong V Luu
(74) *Attorney, Agent, or Firm* — Lempia Summerfield Katz LLC

(57) ABSTRACT

A method and apparatus for automatically assembling components in a computer-aided design (CAD) environment is disclosed. In one embodiment, the method includes identifying a source component and a target component in the CAD environment. The source component and the target component represent different parts of a real-world object. The method also includes computing one or more assembly solutions for assembling the source component and the target component based on a set of rules. Each of the assembly solutions defines a constraint relationship between the source component and the target component. The method also includes automatically generating constraints between geometric entities of the source component and geometric entities of the target component based on the one (Continued)

or more assembly solutions. The method includes outputting a geometric model including the assembled source component and target component on a graphical user interface.

18 Claims, 12 Drawing Sheets

(56) References Cited

U.S. PATENT DOCUMENTS

| | | | |
|---|---|---|---|
| 8,305,376 B2* | 11/2012 | Ran | G06F 17/50 345/420 |
| 8,645,107 B2 | 2/2014 | Gibson et al. | |
| 9,811,610 B2* | 11/2017 | Kannan | G06F 17/50 |
| 2002/0107673 A1* | 8/2002 | Haller | G05B 19/41805 703/1 |
| 2003/0189566 A1* | 10/2003 | Fuki | G06F 17/5086 345/419 |
| 2006/0267980 A1* | 11/2006 | Onoue | G06F 17/30271 345/420 |
| 2008/0294388 A1* | 11/2008 | Tabeling | G06F 17/50 703/1 |
| 2010/0060635 A1* | 3/2010 | Corcoran | G06F 17/5086 345/420 |
| 2011/0098837 A1* | 4/2011 | Yucel | G06F 17/5086 700/104 |
| 2012/0316841 A1* | 12/2012 | Rameau | G06F 17/50 703/1 |
| 2013/0080121 A1* | 3/2013 | Gibson | G06F 17/50 703/1 |
| 2014/0025349 A1* | 1/2014 | Diguet | G06F 17/50 703/1 |
| 2015/0121309 A1* | 4/2015 | Reed | G06F 3/0481 715/824 |
| 2016/0246897 A1* | 8/2016 | Kannan | G06F 17/50 |

OTHER PUBLICATIONS

Hoda A. ElMaraghy, "Artificial Intelligence and Robotic Assembly," Engineering with Computers, vol. 2, pp. 147-155 (1987).

* cited by examiner

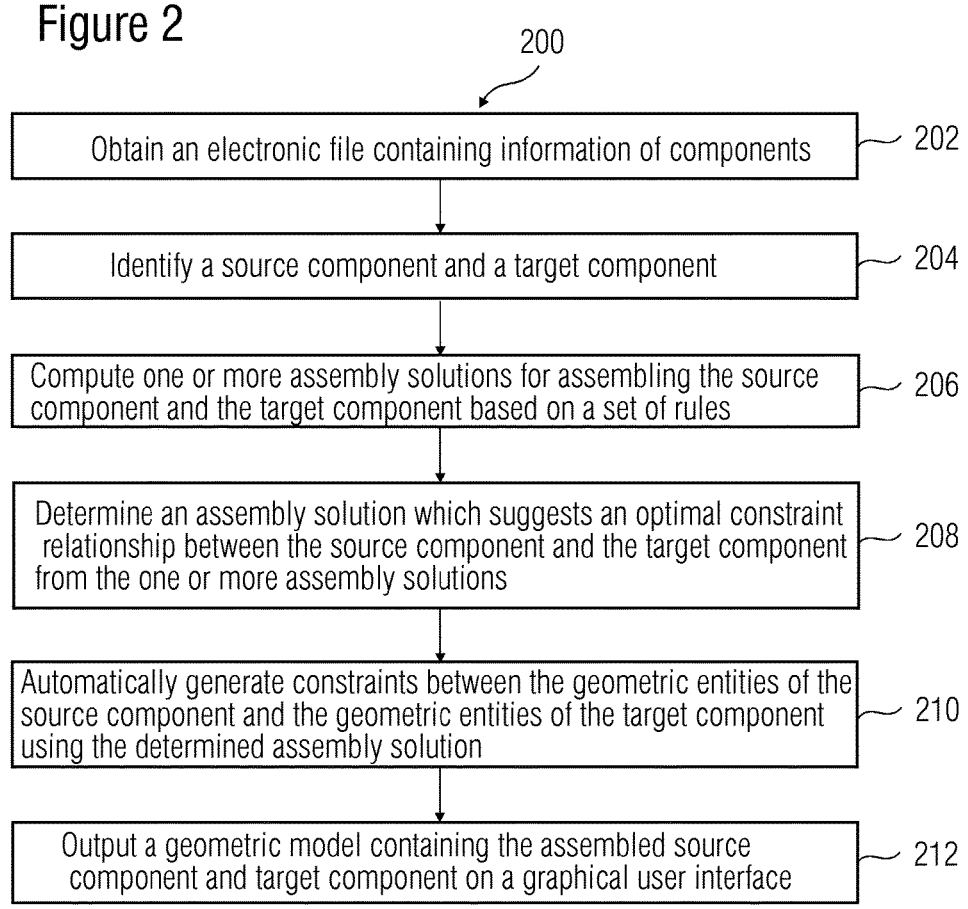

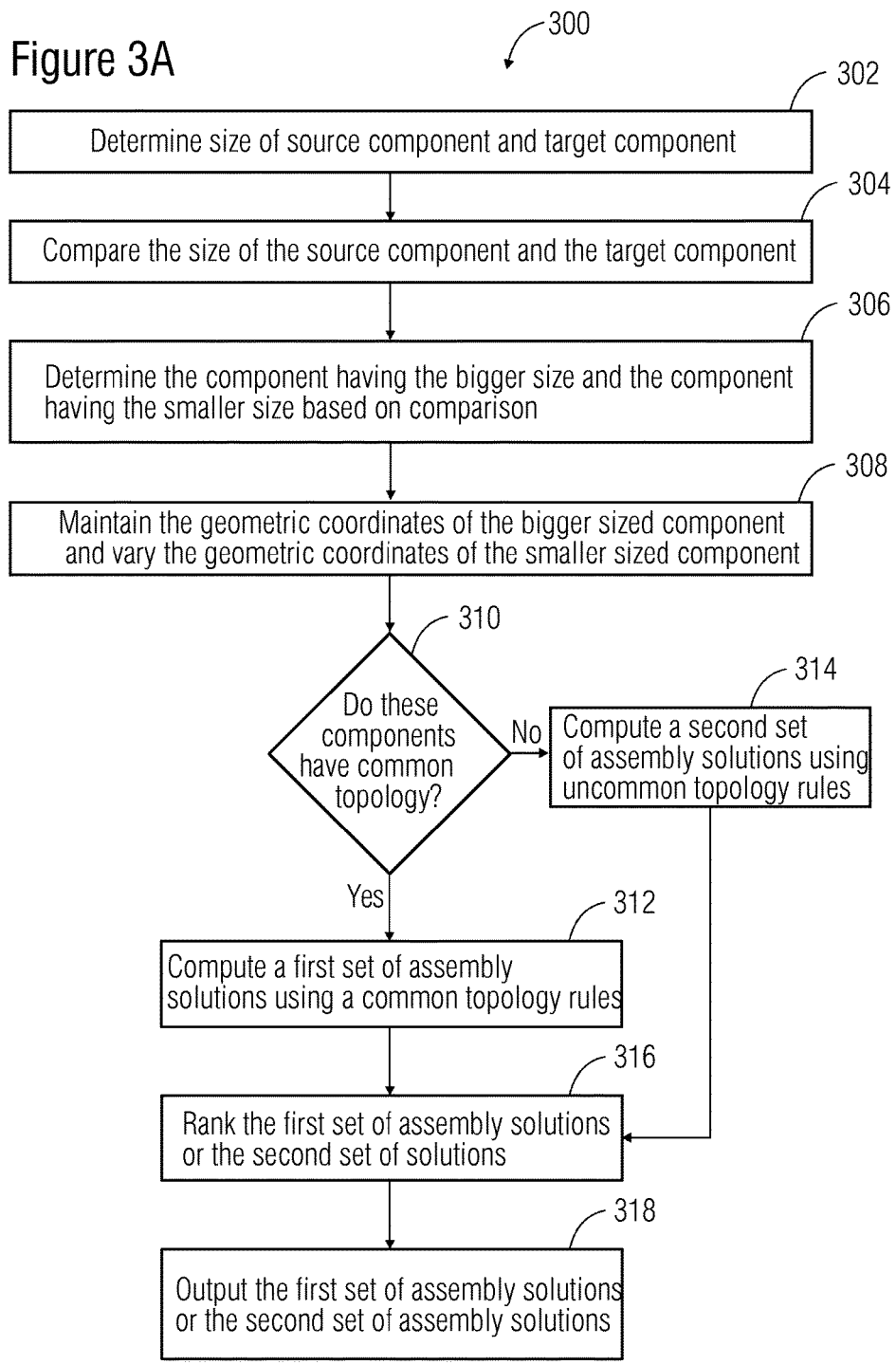

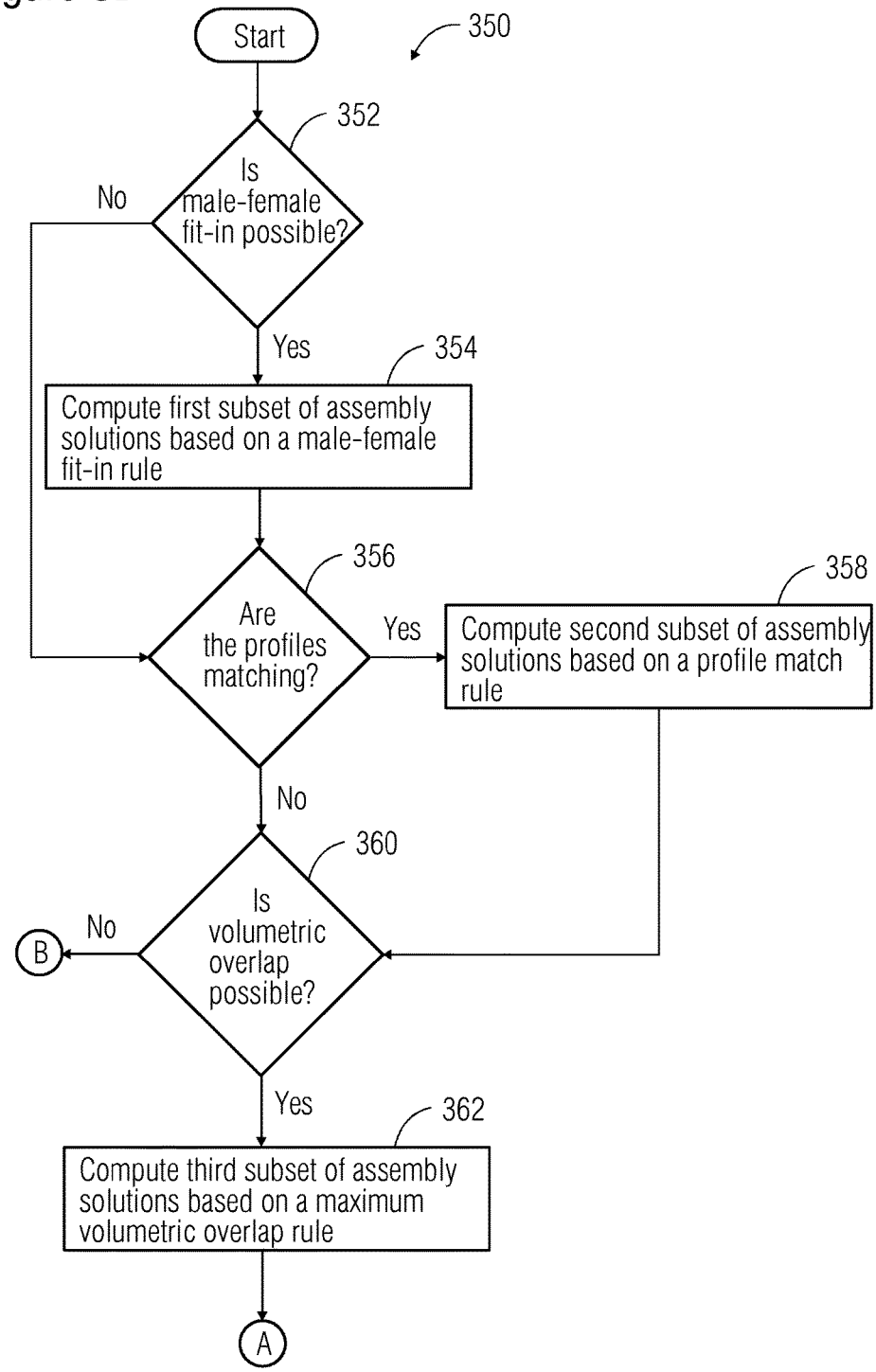

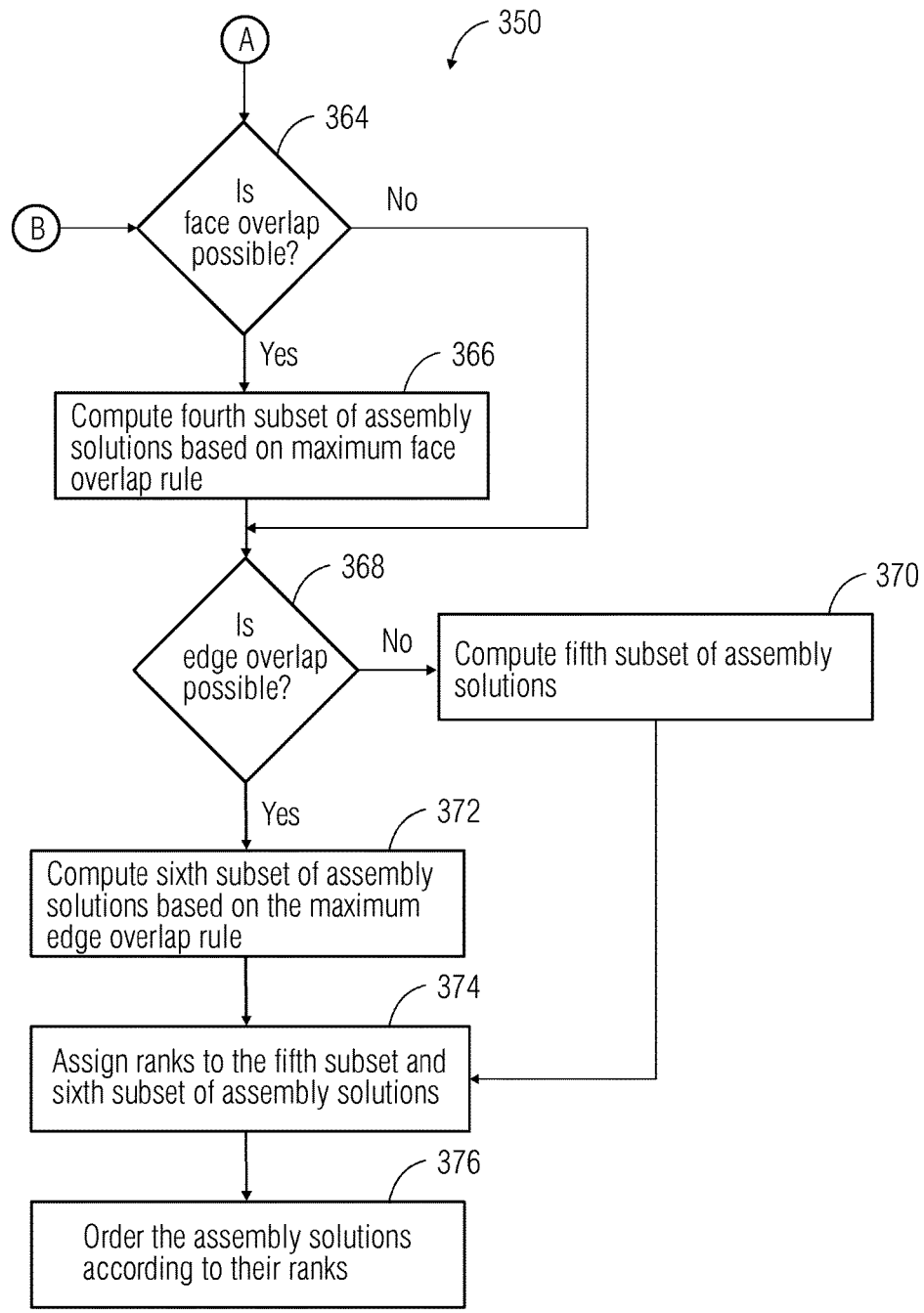
Figure 3B(contd...)

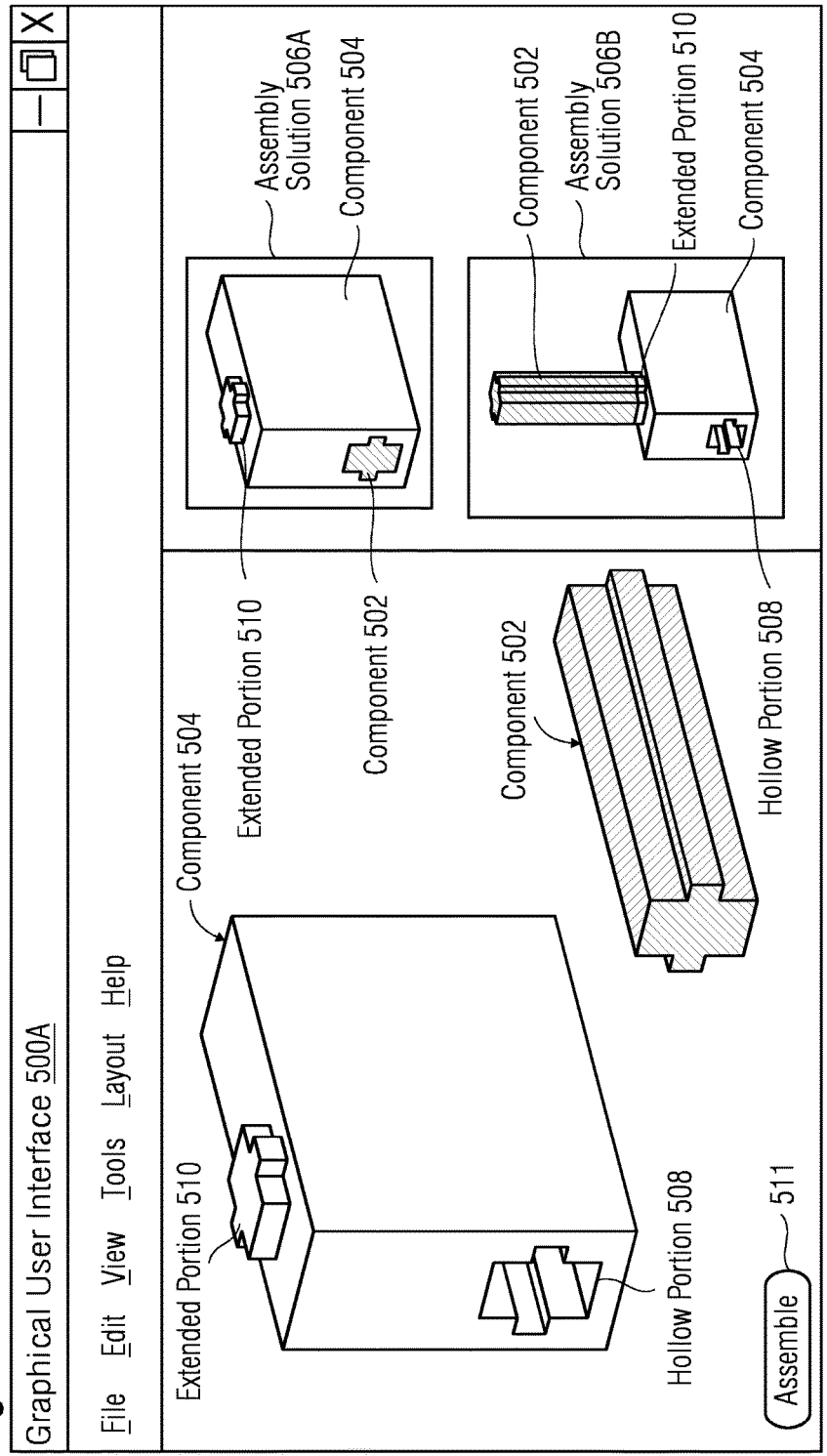

METHOD AND APPARATUS FOR AUTOMATICALLY ASSEMBLING COMPONENTS IN A COMPUTER-AIDED DESIGN (CAD) ENVIRONMENT

This application claims the benefit of Indian Provisional Application No. 675/KOL/2015, filed on Jun. 18, 2015, which is hereby incorporated by reference in its entirety.

FIELD OF TECHNOLOGY

The present embodiments relate to the field of computer-aided design (CAD), and more particularly, to a method and apparatus for automatically assembling components in a CAD environment.

BACKGROUND

Computer-aided design (CAD) is use of a computer system to assist user in creation, modification, and analysis of a complex three dimensional (3D) geometric model generally outputted as electronic files for print, machining, or other manufacturing operations. Typically, a design engineer may use CAD software loaded on the computer system to construct a 3D geometric model of a real-world object. For example, the design engineer may create various components of a real-world object using the CAD software and assemble the components into one or more subassemblies. Then, the design engineer may assemble the one or more subassemblies to form a 3D geometric model of the real-world object.

Assembling of the components involves positioning of components in a 3D geometric model and/or creating appropriate constraint relationships (e.g., mating relationships) among different geometrical entities (e.g., face, edge, etc.) of the components in the 3D geometric model. This requires a lot of manual intervention and is typically a tedious process. For example, in order to define constraint relationship for two components, the design engineer inputs geometrical entities of source and target components to be assembled and manually defines type constraint relationship between the entities. Another known technique allows the design engineer to manually pre-define several constraint relationships for multiple geometric entities of components in advance. Accordingly, in real time, the components are automatically constrained if certain conditions are satisfied based on the pre-defined constrained relationships. However, pre-defining constraint relationships ahead of time may be a cumbersome, time consuming task, and error-prone process.

SUMMARY

A method and apparatus for automatically assembling components in a computer-aided design (CAD) environment is disclosed. In one aspect, a method includes identifying a source component and a target component in the CAD environment, where the source component and the target component represent different parts of a real-world object. The method also includes computing one or more assembly solutions for assembling the source component and the target component based on a set of rules. The method also includes automatically generating constraints between geometric entities of the source component and geometric entities of the target component based on the one or more assembly solutions.

In another aspect, a data processing system includes a processor, a display unit, and an accessible memory coupled to the processor. The memory includes a computer-aided design module configured for identifying a source component and a target component in a CAD environment, where the source component and the target component represent different parts of a real-world object. The computer-aided design module is configured for computing one or more assembly solutions for assembling the source component and the target component based on a set of rules. The computer-aided design module is configured for automatically generating constraints between the geometric entities of the source component and the geometric entities of the target component based on the one or more assembly solutions. The computer-aided design module is also configured for outputting a geometric model containing the assembled source component and target component on the display unit.

In yet another aspect, a non-transitory computer-readable storage medium includes instructions stored therein, which when executed by the data processing system, cause the data processing system to perform the method acts described above.

This summary is provided to introduce a selection of concepts in a simplified form that are further described below in the following description. The summary is not intended to identify features or essential features of the claimed subject matter. The claimed subject matter is not limited to implementations that solve any or all disadvantages noted in any part of this disclosure.

BRIEF DESCRIPTION OF THE DRAWINGS

FIG. 2 is a process flowchart illustrating an exemplary method of automatically assembling components that represent different parts of a real-world object in a computer-aided design (CAD) environment, according to one embodiment;

FIG. 3A is a process flowchart illustrating an exemplary method of computing assembly solutions for assembling a source component and a target component, according to one embodiment;

FIG. 3B is a process flowchart illustrating a detailed method of computing assembly solutions using common topology rules, according to one embodiment;

FIGS. 5A to 5F are screenshot views depicting exemplary assembly solutions generated for assembling components in a CAD environment based on a set of rules.

DETAILED DESCRIPTION

Figure 1:
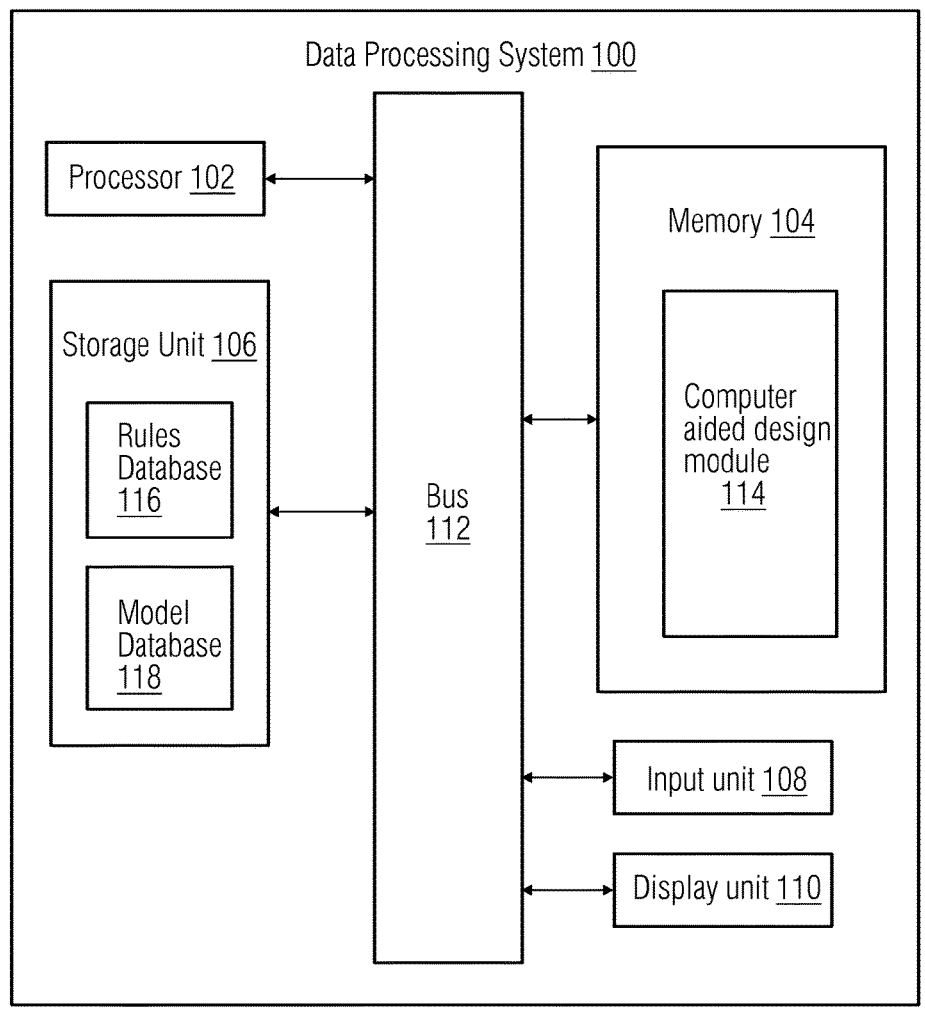
FIG. 1 illustrates a block diagram of a data processing system in which an embodiment may be implemented.

A method and apparatus for automatically assembling components in a computer-aided design (CAD) environment is disclosed. Various embodiments are described with reference to the drawings, where like reference numerals are used in reference to the drawings. Like reference numerals are used to refer to like elements throughout. In the following description, numerous specific details are set forth in order to provide thorough understanding of embodiments. These specific details need not be employed to practice embodiments. In other instances, well known materials or methods have not been described in detail in order to avoid unnecessarily obscuring embodiments. While the disclosure is susceptible to various modifications and alternative forms, specific embodiments thereof are shown by way of example in the drawings and will herein be described in detail. There is no intent to limit the disclosure to the particular forms disclosed. Instead, the disclosure is to cover all modifications, equivalents, and alternatives falling within the spirit and scope of the present disclosure.

FIG. 1 illustrates a block diagram of a data processing system 100 in which an embodiment may be implemented, for example, as a computer-aided design system configured, for example, by software or otherwise to perform the processes as described herein. The data processing system 100 may be a personal computer, a laptop computer, a tablet, and the like. In FIG. 1, the data processing system 100 includes a processor 102, an accessible memory 104, a storage unit 106, an input unit 108, a display unit 110, and bus 112.

The processor 102, as used herein, may be any type of computational circuit such as, but not limited to, a microprocessor, microcontroller, complex instruction set computing microprocessor, reduced instruction set computing microprocessor, very long instruction word microprocessor, explicitly parallel instruction computing microprocessor, graphics processor, digital signal processor, or any other type of processing circuit. The processor 102 may also include embedded controllers, such as generic or programmable logic devices or arrays, application specific integrated circuits, single-chip computers, and the like.

The memory 104 may be volatile memory and non-volatile memory. The memory 104 may be coupled for communication with the processor 102. The processor 102 may execute instructions and/or code stored in the memory 104. A variety of computer-readable storage media may be stored in and accessed from the memory 104. The memory 104 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 104 includes a computer-aided design module 114 stored in the form of machine-readable instructions on any of the above-mentioned storage media and may be in communication to and executed by processor 102. When executed by the processor 102, the computer-aided design module 114 causes the processor 102 to automatically constraint components representing parts of a real-world object in a CAD environment and generate a geometric model including the constrained components. Method acts performed by the processor 102 to achieve the above functionality are described in greater detail in FIGS. 2 and 3.

The storage unit 106 may be a non-transitory storage medium that stores a rules database 116 and a model database 118. The rules database 116 stores a set of rules for automatically assembling components representing different parts of a real-world object. The model database 118 stores geometric models including constrained components. The input unit 108 may include an input device such as keypad, touch-sensitive display, camera (e.g., a camera receiving gesture-based inputs), etc. capable of receiving input signal such as a file including information of components to be constrained. The display unit 110 may be a device for displaying a graphical user interface that visualizes a geometric model containing constrained components. The bus 112 acts as interconnect between the processor 102, the memory 104, the storage unit 106, the input unit 108, and the output unit 110.

The hardware depicted in FIG. 1 may vary for particular implementations. For example, other peripheral devices such as an optical disk drive and the like, Local Area Network (LAN)/Wide Area Network (WAN)/Wireless (e.g., Wi-Fi) adapter, graphics adapter, disk controller, input/output (I/O) adapter may also be used in addition or in place of the hardware depicted. The depicted example is provided for the purpose of explanation only and is not meant to imply architectural limitations with respect to the present disclosure.

A data processing system in accordance with an embodiment includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed, and/or an event such as clicking a mouse button may be generated to actuate a desired response.

One of various commercial operating systems, such as a version of Microsoft Windows™, a product of Microsoft Corporation located in Redmond, Wash., may be employed if suitably modified. The operating system is modified or created in accordance with the present disclosure as described.

Disclosed embodiments provide systems and methods that automatically generate constraints between components in a CAD environment. For example, disclosed techniques may apply a set of rules to automatically generate constraints between the components.

FIG. 2 is a process flowchart 200 illustrating an exemplary method of automatically assembling components that represent different parts of a real-world object in a CAD environment, according to one embodiment. At act 202, an electronic file(s) containing information of components to be constrained is obtained. For example, the electronic file may be a CAD file and may contain geometric information of parts of a real-world object hereinafter referred to as components. The electronic file may be obtained from a location provided by a user of the data processing system 100. The components given in the electronic file may be displayed on a graphical user interface (e.g., the graphical user interface 500A) of the data processing system 100.

At act 204, the components are identified as source component and target component. For example, the component that is to be mated with another component is identified as source component, while the component with which another component is to be mated is known as target component. In another exemplary implementation, the source component and the target component may be identified based on size. The large sized component is identified as target component, while the small sized component is identified as source component. In yet another exemplary implementation, the source component and the target component are identified based on input by the user of the data processing system 100.

At act 206, the one or more assembly solutions for assembling the source component and the target component is computed based on a set of rules. Each of the assembly solutions may define a constraint relationship (e.g., mating relationship) between the source component and the target component. A set of rules may be applied in computing the assembly solutions. The set of rules may include common topology rules to be applied if the source component and the target component have common topology, and uncommon topology rules to be applied if the source component and the target component have uncommon topology. For example, the common topology rule may include comfortable male-female fit-in rule. According to the male-female fit-in rule, it is determined whether a male-female fit-in is possible between the source component and the target component. Exemplary set of rules are described in description of FIG. 3B. Based on the determination, the assembly solution is computed. In case multiple assembly solutions are present, the assembly solutions are assigned a rank. Rank may be assigned based on pre-defined criteria such as optimal constraint relationship, number of rules satisfied by the assembly solution, and so on. The assembly solutions may be ordered and displayed on a graphical user interface according to the assigned ranks. For example, the assembly solution having a highest rank may be placed at the top of the list of assembly solutions, while the assembly solution having the lowest rank may be placed at the bottom of the list of assembly solutions.

At act 208, the assembly solution that suggests an optimal constraint relationship between the source component and the target component from the one or more assembly solutions is determined. In one embodiment, the user may be allowed to select the best possible assembly solution from the assembly solutions for assembling the source component and the target component. For example, the user may select the best possible assembly solution based on the rank of the assembly solution. Alternatively, the user may select the best possible assembly solution based on graphical preview of the assembly solutions. In another embodiment, the assembly solution that suggests the optimal constraint relationship (e.g., assigned a highest rank) may be automatically selected by the data processing system 100 without any user intervention. The user may be allowed to discard the automatic selection of the assembly solution and select another assembly solution from the assembly solutions.

At act 210, constraints between the geometric entities of the source component and the geometric entities of the target component are automatically generated based on the assembly solution determined at act 208. In this act, the assembly solution is automatically applied to the components, thereby assembling the source component and the target component. The information associated with the source component and the target component, and the associated constraints are stored in the model database 118. At act 212, a geometric model including the assembled source component and target component is outputted on a graphical user interface. For example, the geometric model including the assembled source component and target component is visualized on the graphical user interface. In this manner, components that represent different parts of a real-world object are automatically assembled based on a set of rules. A plurality of source components may be simultaneously assembled with a target component in the CAD environment instead of in a sequential order.

FIG. 3A is a process flowchart 300 illustrating an exemplary method of computing assembly solutions for assembling a source component and a target component, according to one embodiment. At act 302, sizes of the source component and the target component, respectively, are determined. At act 304, the size of the source component is compared with the size of the target component. At act 306, the component having the bigger size and the component having the smaller size are determined. For the purpose of illustration, consider that the source component is of smaller size and the target component is of bigger size.

At act 308, geometric coordinates of the bigger sized component are maintained unchanged, and geometric coordinates of the smaller sized component are varied during computing the assembly solutions. In other words, the bigger sized component (e.g., the target component) is kept fixed, while the smaller sized component (e.g., the source component) is moved with respect to the bigger sized component while assembling the source component and the target component. At act 310, it is determined whether the source component and the target components have common topology (e.g., same face and edge). If the source component and the target component have common topology, then at act 312, a first set of assembly solutions are computed using common topology rules in the set of rules. The common topology rules may include male-female fit-in rule, profile match rule, maximum volumetric overlap rule, maximum face overlap rule, maximum edge overlap rule and so on.

If the source component and the target component do not have common topology, then at act 314, a second set of assembly solutions are computed using uncommon topology rules in the set of rules. According to the uncommon topology rules, the source component and the target component are assembled so as to maximize the resultant topology. At act 316, the first set of assembly solutions or the second set of assembly solutions are assigned ranks. In some embodiments, the set of rules are progressively applied on the assembly solutions. The assembly solutions that have satisfied all the rules are ranked highest, while the assembly solutions that satisfied the least number of the rules are ranked lowest. In other embodiments, the assembly solutions may be ranked based on any other criteria. At act 318, the first set of assembly solutions or the second set of assembly solutions are ordered according to respective ranks and outputted on a graphical user interface in the order of respective ranks.

FIG. 3B is a process flowchart 350 illustrating a detailed method of computing assembly solutions using the common topology rules, according to one embodiment. At act 352, it is determined whether a male-female fit-in is possible between the source component and the target component. If it is determined that the male-female fit-in is possible, then at act 354, a first subset of assembly solutions is computed based on the male-female fit-in rule. If it is determined that the male-female fit-in is not possible, then the process 350 performs act 356.

At act 356, it is determined whether the profile of the source component matches with the profile of the target component. If there is a match in the profiles, then at act 358, a second subset of assembly solutions is computed using the profile match rule. The second subset of assembly solutions includes the first subset of assembly solutions and/or new assembly solutions that satisfy the profile match rule. If there is no match in the profiles, then the process 350 performs act 360. At act 360, it is determined whether there is volumetric overlap between the source component and the target component. If there is volumetric overlap between the source component and the target component, then at act 362, a third subset of assembly solutions is computed based on a maximum volumetric overlap rule. The third subset of assembly solutions includes the first subset of assembly solutions, the second subset of assembly solutions and/or new assembly solutions that satisfy the maximum volumetric overlap rule. If there is no volumetric overlap, then the process 350 performs act 364.

At act 364, it is determined whether there is face overlap between the source component and the target component. If there is face overlap, then at act 366, a fourth subset of assembly solutions is computed based on the maximum face overlap rule. The fourth subset of assembly solutions includes the first subset of assembly solutions, the second subset of assembly solutions, the third subset of assembly solutions and/or new assembly solutions that satisfy the maximum face overlap rule. If there is no face overlap, then the process 350 performs act 368.

At act 368, it is determined whether there is edge overlap between the source component and the target component. If there is no edge overlap, then at act 370, a fifth subset of assembly solutions is computed. The fifth set of assembly solutions includes the first subset of assembly solutions, the second subset of assembly solutions, the third subset of assembly solutions, and the fourth subset of assembly solutions. If there is edge overlap, then at act 372, a sixth subset of assembly solutions is computed based on the maximum edge overlap rule. The sixth subset of assembly solutions includes the first subset of assembly solutions, the second subset of assembly solutions, the third subset of assembly solutions, and the fourth subset of assembly solutions and/or new assembly solutions that satisfy the maximum edge overlap rule.

At act 374, a unique rank is assigned to each assembly solution in the fifth subset and sixth subset of assembly solutions. In some embodiments, a rank is assigned based on number of rules satisfied by an assembly solution. For example, a highest rank is assigned if an assembly solution has satisfied all the above mentioned rules. At act 376, the assembly solutions are ordered according to respective ranks. In this manner, all the rules are applied in a progressive manner to compute assembly solutions for assembling components in a CAD environment. All the assembly solutions may not be possible, as some of the assembly solutions may not exist based on geometry of source and target components.

Figure 4:
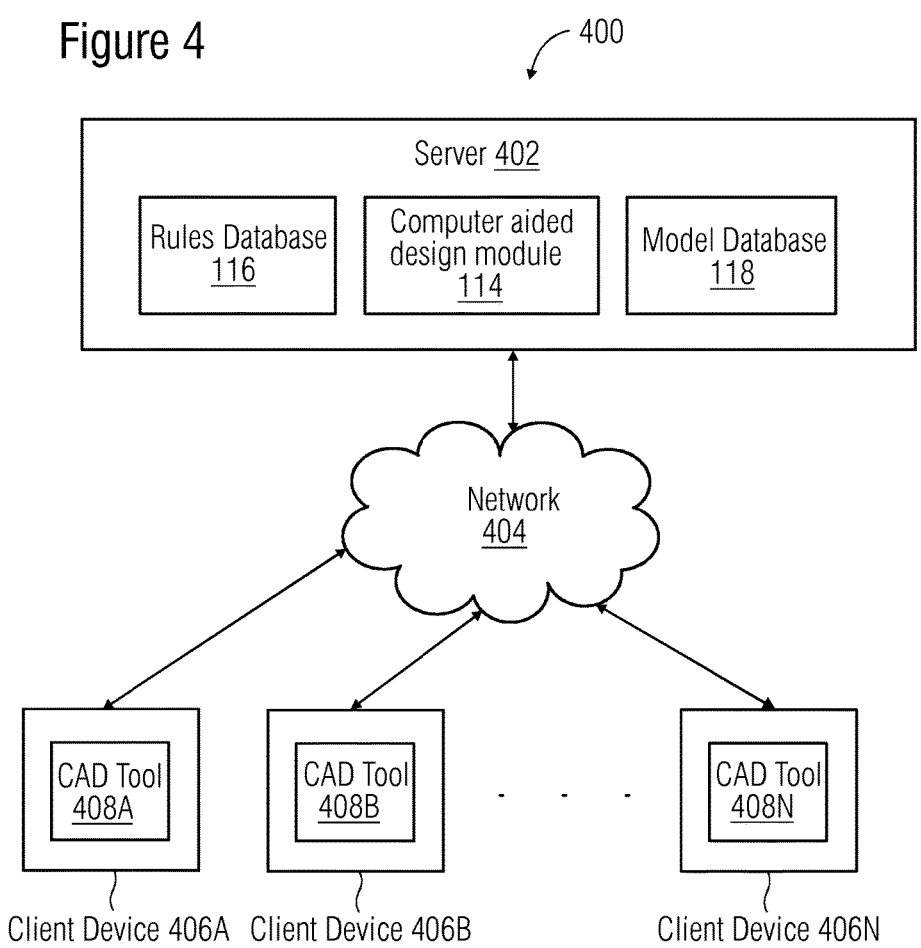
FIG. 4 is a block diagram of client-server architecture that provides geometric modeling of components representing different parts of a real-world object, according to one embodiment.

FIG. 4 is a block diagram of client-server architecture 400 that provides geometric modeling of components representing different parts of a real-world object, according to one embodiment. For example, the client-server architecture 400 includes a server 402 and a plurality of client devices 406A-N. Each of the client devices 406A-N is connected to the server 402 via a network 404 (e.g., Local Area Network (LAN), Wide Area Network (WAN), Wi-Fi, etc.). The server 402 is an exemplary implementation of the data processing system of FIG. 1.

The server 402 includes the computer-aided design module 114, the rules database 116, and the model database 118. The computer-aided design module 114 may be stored on the server 402 in the form of machine-readable instructions. The server 402 may include an accessible memory in which the machine-readable instructions are stored. The server 402 may include a processor for executing the machine-readable instructions. The server 402 may also include a storage unit for storing the rules database 116 and the model database 118. Additionally, the server 402 may include a network interface for communicating with the client devices 406A-N via the network 404. The machine-readable instructions may cause the processor to automatically generate constraints between components based on the set of rules stored in the rules database 116.

The client devices 406A-N are provided with computer-aided design tools 408A-N. Users of the client devices 406A-N may access the server 402 via the graphical user interface of the respective computer-aided design tools 408A-N. In an embodiment, a user of the client device 406A may send a request to the server 402 to load a CAD file containing information associated with components to be assembled using the computer-aided design tool 408A. The server 402 may send the CAD file to the client device 406A via the network 404. The client device 406A may send a request for assembling two components in the CAD file to the server 402. Accordingly, the computer-aided design module 114 in the server 402 automatically generates constraint between the components using a set of rules stored in the rules database 116 and outputs a geometric model containing the constrained components on the graphical user interface of the computer-aided design tool 408A of the client device 406A. One or more of the present embodiments may be implemented in a cloud computing environment, where the computer-aided design module 114 is hosted on a cloud server.

Figure 5B:
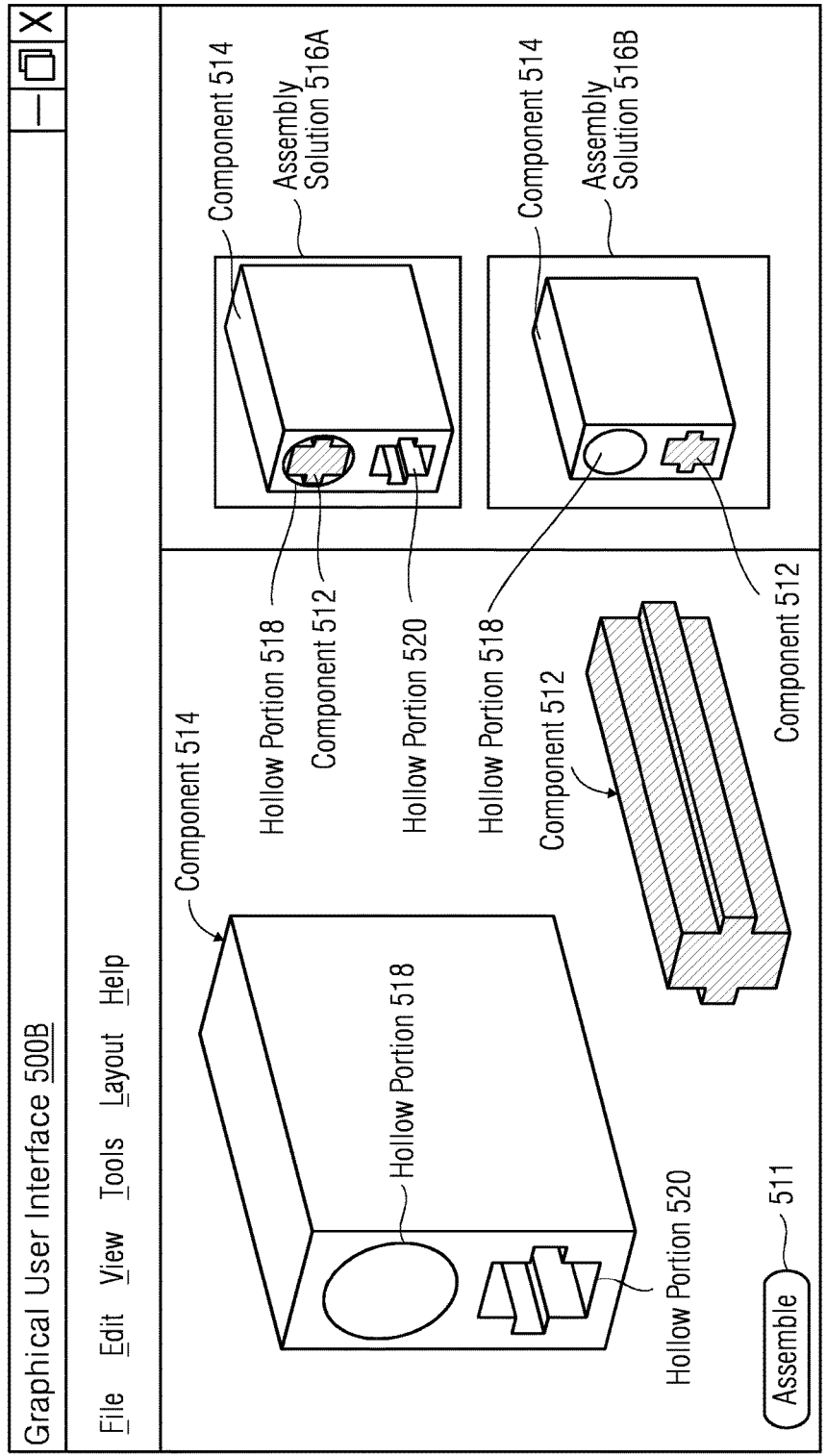

FIGS. 5A to 5F are screenshot views depicting exemplary assembly solutions generated for assembling components in a CAD environment based on a set of rules. FIGS. 5A-5F illustrate a graphical user interfaces 500A-F of a computer-aided design tool. In FIG. 5A, the graphical user interface 500A displays CAD environment including two components 502 and 504. Consider that the user wishes to assemble the two components to generate a geometric model. Upon selection of 'assemble' button 511 by a user, the data processing system 100 identifies source component and target component among the components 502 and 504. Since the component 502 is smaller and to be mated with the component 504, the component 502 is identified as source component. Similarly, the component 504 is of bigger size, and the component 504 is identified as target component.

The data processing system 100 computes possible assembly solutions 506A and 506B based on a comfortable male-female fit-in rule. According to the comfortable male-female fit-in rule, it is determined whether a comfortable male-female fit-in is possible between the source component 502 and the target component 504. In the assembly solution 506A, the source component 502 is inserted inside the hollow portion 508 of the target component 504. In the assembly solution 506B, the source component 502 is vertically disposed over an extended portion 510 of the target component 504. As shown from both the assembly solutions 506A and 506B, the assembly solution 506A suggests an optimal constraint relationship between the source component 502 and the target component 504 compared to the assembly solution 506B, and thus, the assembly solution 506A is ranked higher than the assembly solution 506B. Accordingly, the assembly solution 506A is placed at the top of the list of assembly solutions 506A and 506B, and the assembly solution 506B is placed at the bottom of the list. Consequently, the data processing system 100 may automatically generate appropriate constraints between the geometric entities (e.g., face, edge, etc.) of the source component 502 and the geometric entities (e.g., face, edge, etc.) of the hollow portion 508 of the target component 504 based on the assembly solution 506A. On the contrary, the user may discard the assembly solution 506A and select the assembly solution 506B. In such case, the data processing system 100 may generate constraints between the geometric entities of the source component 502 and the geometric entities of the extended portion 510 of the target component 504 based on selection of the assembly solution 506B by the user.

In FIG. 5B, the graphical user interface 500B displays a CAD environment including components 512 and 514. The component 514 has two hollow portions, (e.g., circular shaped hollow portion 518 and cross shaped hollow portion 520). Consider that the user wishes to assemble the components 512 and 514. Also, consider that the data processing system 100 has identified the component 512 as source component and the component 514 as target component based on the size of the components 512 and 514. When the user clicks on 'assemble' button 511, the data processing system 100 computes assembly solutions 516A and 516B based on a profile match rule. According to the profile match rule, it is determined whether there is a match between a profile of the source component and a profile of the hollow portions 518 or 520 of the target component 514. In the assembly solution 516A, the source component 512, which is cross-shaped, is inserted inside the circular shaped hollow portion 518 of the target component 514. In the assembly solution 516B, the source component 512 is inserted inside the cross-shaped hollow portion 520 of the target component 514. It is shown in the assembly solution 516A that the profile (e.g., cross-shaped) of the source component 512 does not match with the profile (e.g., circular shaped) of the hollow portion 518 of the target component 514. However, in the assembly solution 516B, the profile (e.g., cross-shaped) of the source component 512 matches with the profile (e.g., cross-shaped) of the hollow portion 520 of the target component 514. Hence, the assembly solution 516B suggests an optimal constraint relationship between the source component 512 and the cross-shaped hollow portion 520 of the target component 514 compared to the assembly solution 516A. Consequently, the data processing system 100 may automatically generate constraints between the geometric entities of the source component 512 and the geometric entities of the hollow portion 520 of the target component 514 according to the assembly solution 516B.

Figure 5C:
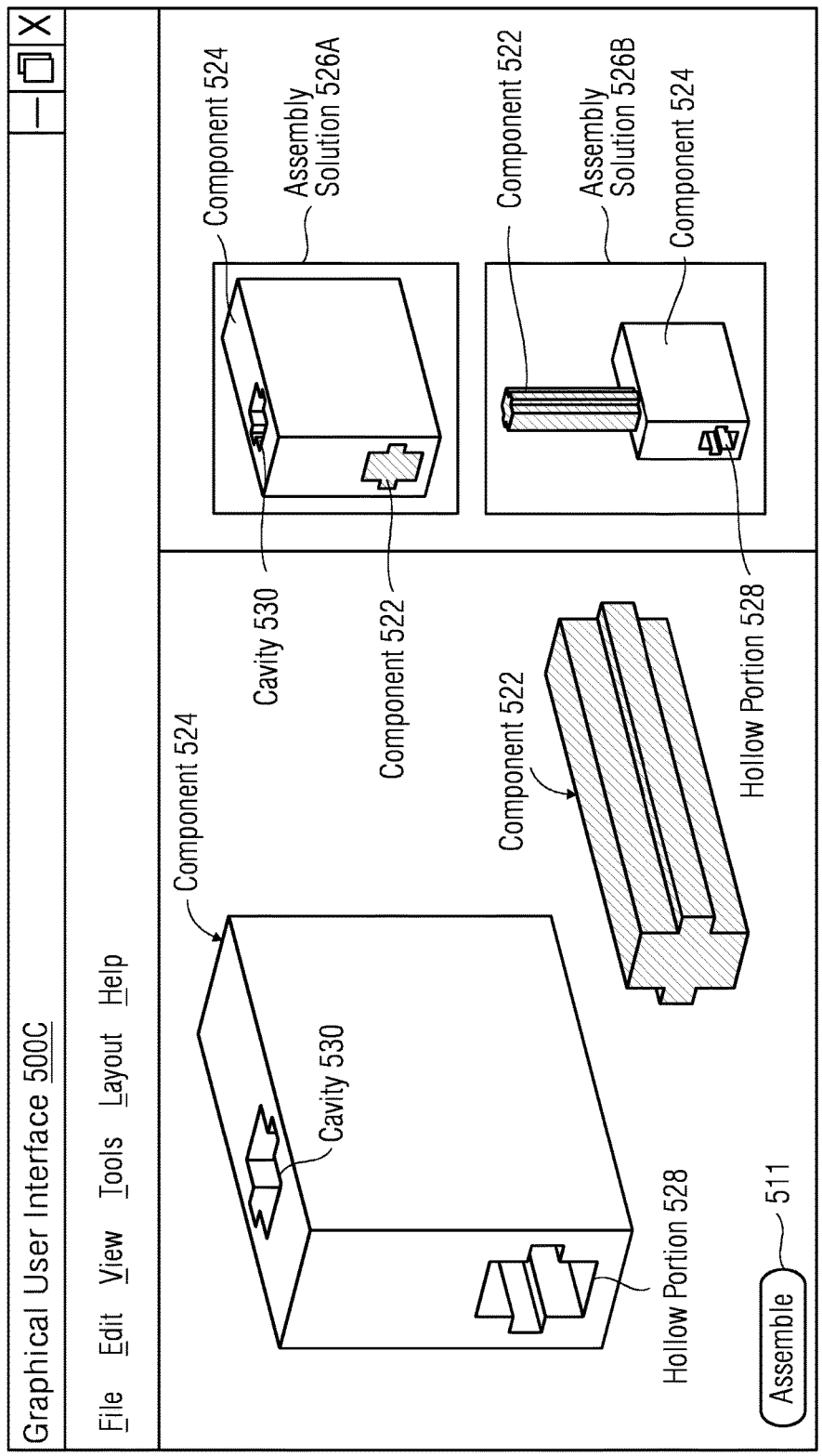

In FIG. 5C, the graphical user interface 500C displays a CAD environment containing two components 522 and 524. The component 522 is cross-shaped, and the component 524 has a cross-shaped hollow portion 528 and a cross-shaped cavity 530. Consider that the user wishes to assemble the components 522 and 524. Also, consider that the data processing system 100 has identified the component 522 as source component and the component 524 as target component based on the size of the components 522 and 524. When the user clicks on 'assemble' button 511, the data processing system 100 computes assembly solutions 526A and 526B based on a maximum volumetric overlap rule. According to the maximum volumetric overlap rule, it is determined whether the hollow portion 528 or the cavity 530 of the target component 524 is having maximum face and edge overlap with one or more faces as the source component 522, resulting in maximum volumetric overlap. In the assembly solution 526A, the source component 522, which is cross-shaped, is inserted inside the cross-shaped hollow portion 528 of the target component 524. In the assembly solution 526B, the source component 522 is inserted inside the cross-shaped cavity 530 of the target member 524. It is shown from the assembly solution 526A that there is a maximum volumetric overlap between the source component 522 and the cross-shaped hollow portion 528 of the target component 524 compared to the assembly solution 526B. Hence, the assembly solution 526A suggests an optimal constraint relationship between the source component 522 and the cross-shaped hollow portion 528 of the target component 524 compared to the assembly solution 526B. Consequently, the data processing system 100 may automatically generate constraints between the geometric entities of the source component 522 and the geometric entities of the hollow portion 528 of the target component 524 according to the assembly solution 526A.

Figure 5D:
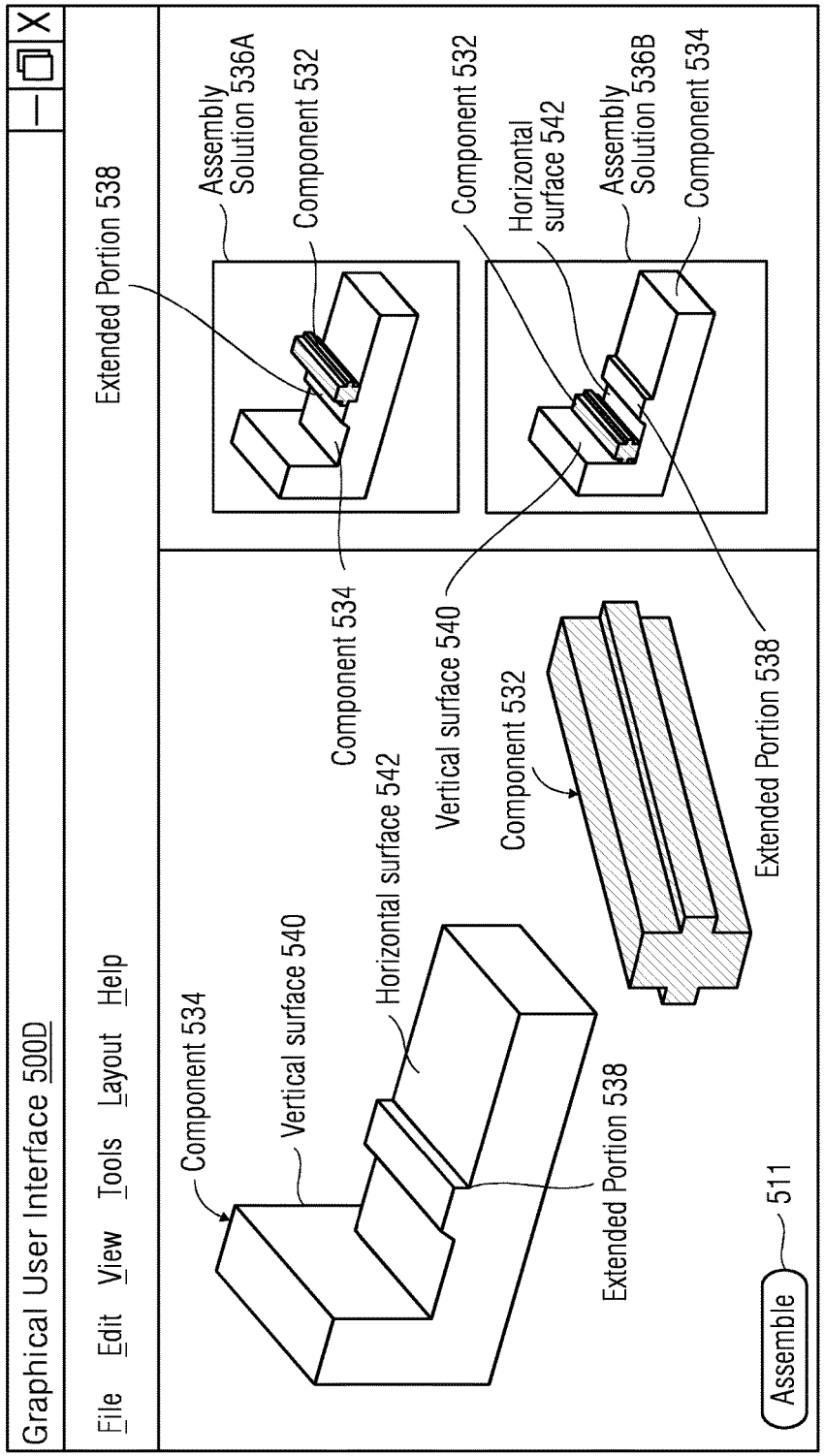

In FIG. 5D, the graphical user interface 500D displays a CAD environment containing two components 532 and 534. The component 524 includes an extended portion 538, a vertical surface 540 and a horizontal surface 542. Consider that the user wishes to assemble the components 532 and 534. Also, consider that the data processing system 100 has identified the component 532 as source component and the component 534 as target component based on the size of the components 532 and 534. When the user clicks on 'assemble' button 511, the data processing system 100 computes assembly solutions 536A and 536B based on a maximum face overlap rule. According to the maximum face overlap rule, it is determined whether the face of the target component 534 is having maximum face overlap with the source component 532. In the assembly solution 536A, the three faces of the source component 532 are overlapping with faces (e.g., two faces of the extended portion and the horizontal surface 542) of the target component 534. In the assembly solution 536B, the two faces of the source component 532 are overlapping with the faces (e.g., the vertical surface 540 and the horizontal surface 542) of the target component 534. It is shown that there is maximum face overlap in the assembly solution 536A compared to the assembly solution 536B. Hence, the assembly solution 536A suggests optimal constraint relationship between the source component 532 and the extended portion 538 of the target component 534 and is ranked higher than the assembly solution 536B. Consequently, the data processing system 100 may automatically generate constraints between the geometric entities of the source component 532 and the geometric entities of the extended portion 538 of the target component 534 according to the assembly solution 536A.

Figure 5E:
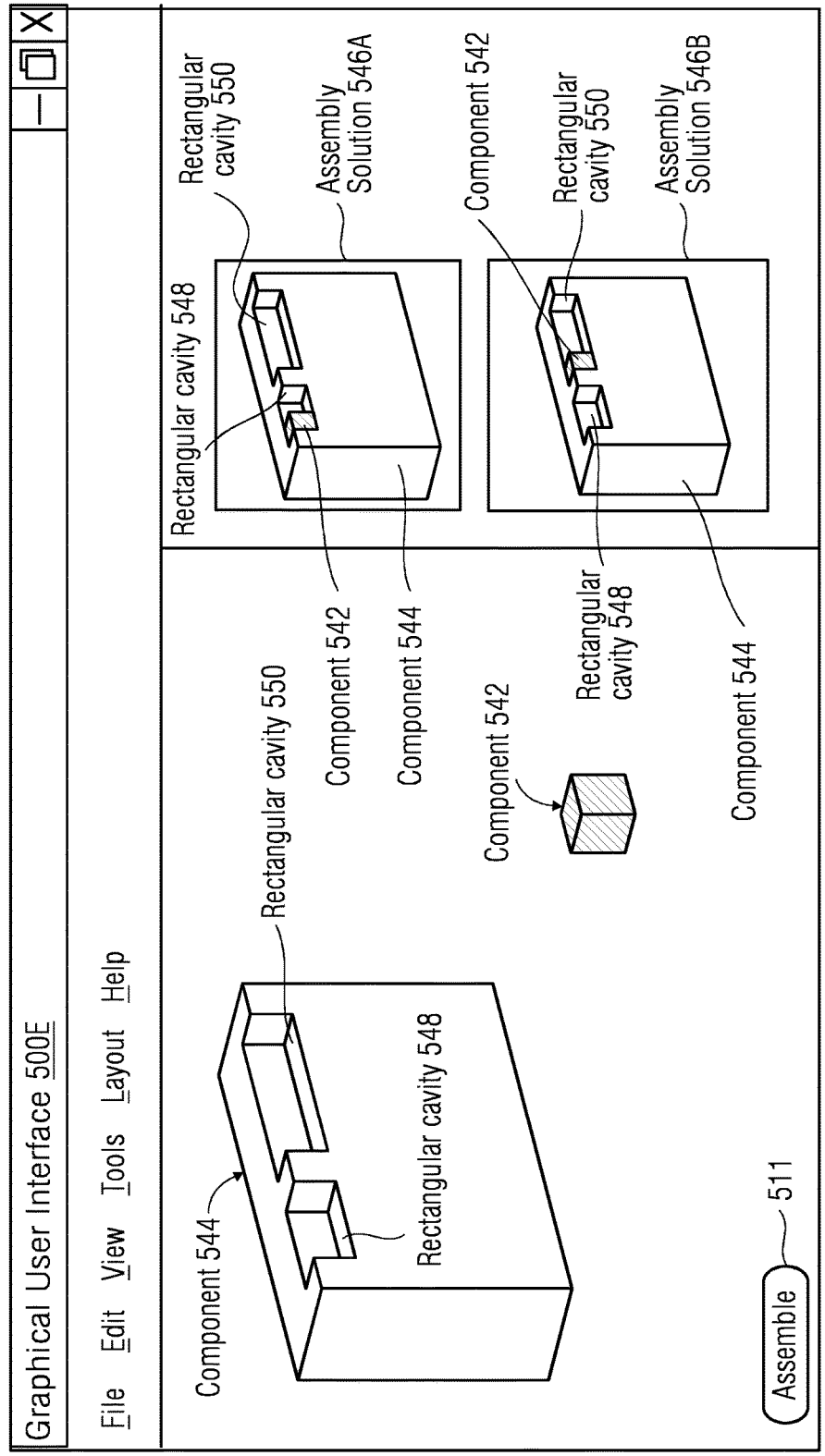

In FIG. 5E, the graphical user interface 500E displays a CAD environment containing two components 542 and 544. Consider that the user wishes to assemble the components 542 and 544. Also, consider that the data processing system 100 has identified the component 542 as source component and the component 544 as target component based on the size of the components 542 and 544. When the user clicks on 'assemble' button 511, the data processing system 100 computes assembly solutions 546A and 546B based on a maximum edge overlap rule. According to the maximum edge overlap rule, it is determined whether the edge of the target component 544 is having maximum edge overlap (e.g., in terms of percentage of edges overlapped) with the source component 542. In the assembly solution 546A, the edges of the source component 542 are in contact with edges of rectangular cavity 548 of the target component 544. In the assembly solution 546B, the edges of the source component 542 are in contact with edges of the rectangular cavity 550 of the target component 544. It is shown that there is maximum edge overlap in the assembly solution 546A compared to the assembly solution 546B. Hence, the assembly solution 546A suggests optimal constraint relationship between the source component 542 and the rectangular cavity 548 of the target component 544. Consequently, the data processing system 100 may automatically generate constraints between the geometric entities of the source component 542 and the geometric entities of the rectangular cavity 548 of the target component 544 according to the assembly solution 546A.

Figure 5F:
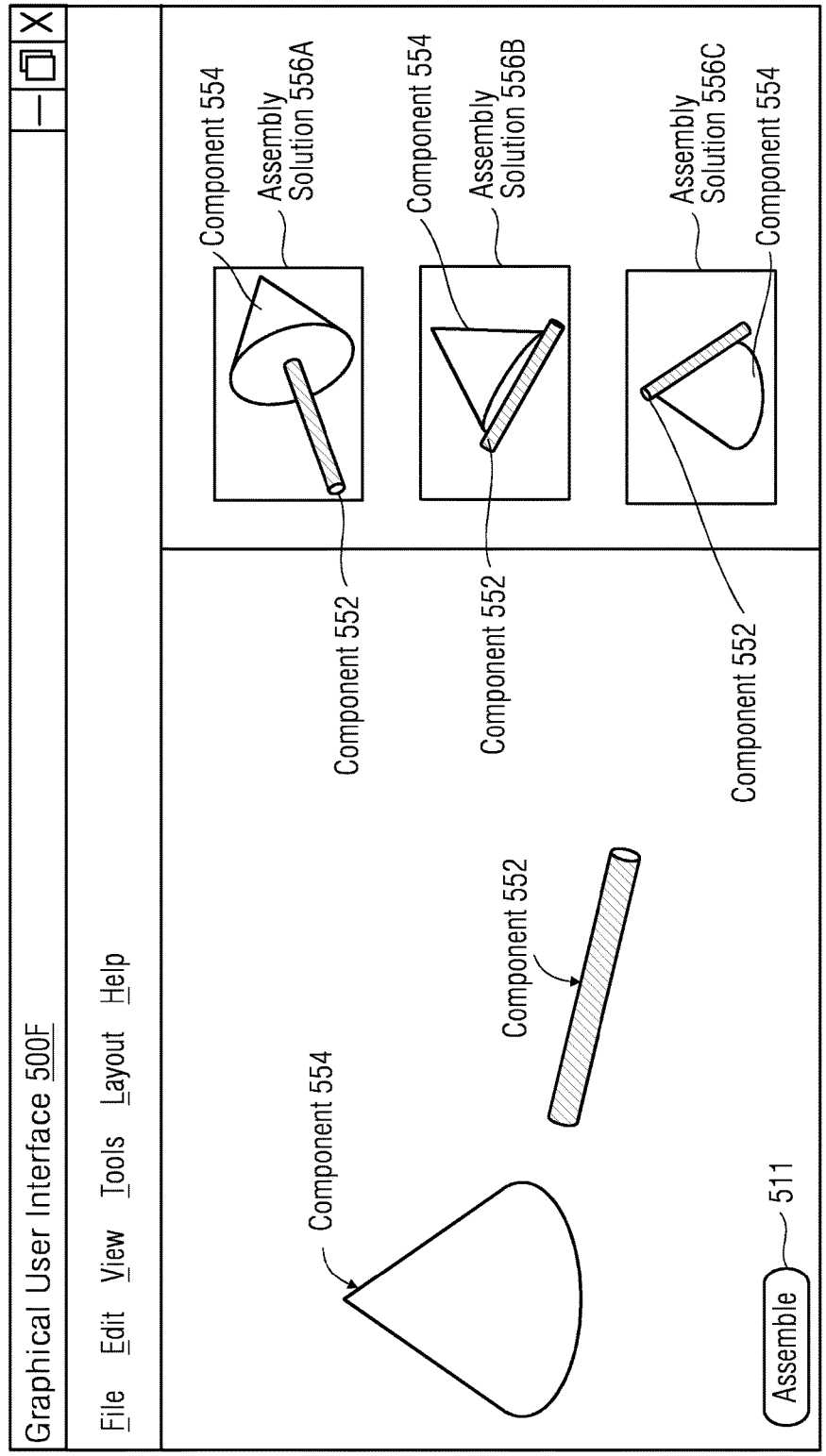

In FIG. 5F, the graphical user interface 500F displays a CAD environment containing two components 552 and 554. The component 552 is a rod shaped object, and the component 554 is a conical object. It is shown that both the components 552 and 554 have uncommon topology. In such case, the data processing system 100 computes assembly solutions 556A, 556B and 556C based on the uncommon topology rule. According to the uncommon topology rule, the components 552 and 554 may be assembled in such a manner so as to maximize the resultant topology. It is shown that the resultant topology is maximized according to the assembly solution 556A since the assembly solution 556A is having resultant topology as "face" as the face of the rod shaped object 552 is in contact with the face of the conical object 554. In the case of the assembly solution 556B, the resultant topology is "edge", as the edge of the rod shaped object 552 is in contact with the face of the conical object 554. Similarly, in the case of the assembly solution 556C, the resultant topology is "edge", as the edge of the rod shaped object 552 is in contact with the edge of the conical object 554. The assembly solution 556A is ranked highest among the assembly solutions 556A-C since the resultant face topology is given higher preference. Among the assembly solutions 556B and 556C, the assembly solution 556B has larger resultant edge topology, and hence, the assembly solution 556B is ranked higher than the assembly solution 556C. Since the assembly solution 556A has resultant face topology, the assembly solution 556A suggests optimal constraint relationship between the component 552 and the component 554 among the assembly solutions 556A-C. Consequently, the data processing system 100 may automatically generate constraints between the geometric entities of the source component 552 and the geometric entities of the target component 554 according to the assembly solution 556A.

In various embodiments, methods and systems described above in FIGS. 1 to 5E disclose automatically assembling components based on a set of pre-defined rules and creating constraints between geometric entities of the components to form a geometric model in a CAD environment. Thus, need for positioning components in an assembly and defining constraint relationship between the components based on user inputs is eliminated. This helps is saving manual effort as well as significantly reduces design time.

Those skilled in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of the data processing system 100 may conform to any of the various current implementation and practices known in the art.

It is to be understood that the system and methods described herein may be implemented in various forms of hardware, software, firmware, special purpose processors, or a combination thereof. One or more of the present embodiments may take a form of a computer program product including program modules accessible from computer-usable or computer-readable medium storing program code for use by or in connection with one or more computers, processors, or instruction execution system. For the purpose of this description, a computer-usable or computer-readable medium may be any apparatus that may contain, store, communicate, propagate, or transport the program for use by or in connection with the instruction execution system, apparatus, or device. The medium may be an electronic, magnetic, optical, electromagnetic, infrared, or semiconductor system (or apparatus or device) or propagation mediums in and of themselves, as signal carriers are not included in the definition of physical computer-readable medium including a semiconductor or solid state memory, magnetic tape, a removable computer diskette, random access memory (RAM), a read only memory (ROM), a rigid magnetic disk, optical disk such as compact disk read-only memory (CD-ROM), compact disk read/write, and DVD, or any combination thereof Both processors and program code for implementing each aspect of the technology may be centralized or distributed (or a combination thereof), as known to those skilled in the art.

While the present disclosure has been described in detail with reference to certain embodiments, the present disclosure is not limited to those embodiments. In view of the present disclosure, many modifications and variations would present themselves to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within the scope.

The invention claimed is:

1. A computer-implemented method of automatically assembling components in a computer-aided design (CAD) environment, the computer-implemented method comprising:

identifying, using a data processing system, a source component and a target component in the CAD environment, wherein the source component and the target component represent different parts of a real-world object;

computing one or more assembly solutions for assembling the source component and the target component based on a set of rules;

automatically generating constraints between geometric entities of the source component and geometric entities of the target component based on the one or more assembly solutions to generate a geometric model comprising constrained components;

outputting the geometric model comprising the assembled source component and target component on a graphical user interface, wherein computing the one or more assembly solutions for assembling the source component and the target component based on the set of rules comprises determining whether the source component and the target component have common topology; and when the source component and the target component do not have common topology, computing a set of assembly solutions for assembling the source component and the target component to maximize resultant topology using uncommon topology rules in the set of rules.

2. The computer-implemented method of claim 1, further comprising:

assigning ranks to the one or more assembly solutions;

ordering the one or more assembly solutions according to the respective ranks; and displaying the one or more assembly solutions in the order of the respective ranks on the graphical user interface.

3. The computer-implemented method of claim 1, wherein each assembly solution of the one or more assembly solutions defines a constraint relationship between the source component and the target component.

4. The computer-implemented method of claim 3, wherein automatically generating the constraints between the geometric entities of the source component and the geometric entities of the target component comprises:
  determining an assembly solution that suggests an optimal constraint relationship between the source component and the target component from the one or more assembly solutions; and
  automatically generating the constraints between the geometric entities of the source component and the geometric entities of the target component using the determined assembly solution.

5. The computer-implemented method of claim 1, wherein computing the one or more assembly solutions for assembling the source component and the target component based on the set of rules further comprises:
  determining size of the source component and the target component to be assembled in the CAD environment;
  comparing the size of the source component and the size of the target component;
  maintaining geometric coordinates of the component of the source component and the target component that is bigger in size unchanged and varying geometric coordinates of the component of the source component and the target component that is smaller in size with respect to the bigger sized component in the CAD environment; and
  when the source component and the target component have common topology, computing a set of assembly solutions for assembling the source component and the target component using common topology rules in the set of rules.

6. The computer-implemented method of claim 1, further comprising:
  storing information associated with the geometric model comprising the assembled source component and target component in a model database.

7. A data processing system comprising:
  a processor;
  a display unit; and
  an accessible memory coupled to the processor,
  wherein the memory comprises a computer-aided design module configured to:
    identify a source component and a target component in a computer-aided design (CAD) environment, wherein the source component and the target component represent different parts of a real-world object;
    compute one or more assembly solutions for assembling the source component and the target component based on a set of rules;
    automatically generate constraints between geometric entities of the source component and geometric entities of the target component based on the one or more assembly solutions to generate a geometric model comprising constrained components;
    output the geometric model comprising the assembled source component and target component on the display unit, wherein the computation of the one or more assembly solutions based on the set of rules comprises determination, by the computer-aided design module, whether the source component and the target component have common topology; and
    when the source component and the target component do not have common topology, compute a set of assembly solutions for assembling the source component and the target component to maximize resultant topology using uncommon topology rules in the set of rules.

8. The data processing system of claim 7, wherein the computer-aided design module is configured to:
  assign ranks to the one or more assembly solutions;
  order the one or more assembly solutions according to the respective ranks; and
  display the one or more assembly solutions in the order of the respective ranks on the display unit.

9. The data processing system of claim 7, wherein in the automatic generation of the constraints between the geometric entities of the source component and the geometric entities of the target component, the computer-aided design module is configured to:
  determine an assembly solution that suggests an optimal constraint relationship between the source component and the target component from the one or more assembly solutions; and
  automatically generate the constraints between the geometric entities of the source component and the geometric entities of the target component using the determined assembly solution.

10. The data processing system of claim 7, wherein in computation of the one or more assembly solutions based on the set of rules, the computer-aided design module is further configured to:
  determine size of the source component and the target component to be assembled in the CAD environment;
  compare the size of the source component and the size of the target component; and
  maintain geometric coordinates of the component of the source component and the target component that is bigger in size unchanged and vary geometric coordinates of the component of the source component and the target component that is smaller in size with respect to the bigger sized component in the CAD environment; and
  when the source component and the target component have common topology, compute a set of assembly solutions for assembling the source component and the target component using common topology rules in the set of rules.

11. The data processing system of claim 7, wherein the computer-aided design module is configured to store information associated with the geometric model comprising the assembled source component and target component in a model database.

12. The data processing system of claim 7, wherein each of the assembly solutions defines a constraint relationship between the source component and the target component.

13. A non-transitory computer-readable storage medium storing instructions executable by a data processing system to automatically assemble components in a computer-aided design (CAD) environment, the instructions comprising:
  identifying a source component and a target component in the CAD environment, the source component and the target component representing different parts of a real-world object;
  computing one or more assembly solutions for assembling the source component and the target component based on a set of rules;
  automatically generating constraints between geometric entities of the source component and geometric entities of the target component based on the one or more assembly solutions to generate a geometric model comprising constrained components;

outputting the geometric model comprising the assembled source component and target component on a graphical user interface, wherein computing the one or more assembly solutions based on the set of rules comprises determining whether the source component and the target component have common topology; and when the source component and the target component do not have common topology, computing a set of assembly solutions for assembling the source component and the target component to maximize resultant topology using uncommon topology rules in the set of rules.

14. The non-transitory computer-readable storage medium of claim 13, wherein the instructions further comprise:

assigning a rank to the one or more assembly solutions;
ordering the one or more assembly solutions according to the respective ranks; and
displaying the one or more assembly solutions in the order of the respective ranks on the graphical user interface.

15. The non-transitory computer-readable storage medium of claim 13, wherein automatically generating the constraints between the geometric entities of the source component and the geometric entities of the target component comprises:

determining an assembly solution that suggests an optimal constraint relationship between the source component and the target component from the one or more assembly solutions; and
automatically generating the constraints between the geometric entities of the source component and the geometric entities of the target component using the determined assembly solution.

16. The non-transitory computer-readable storage medium of claim 13, wherein computing the one or more assembly solutions based on the set of rules further comprises:

determining size of the source component and the target component to be assembled in the CAD environment;
comparing the size of the source component and the size of the target component; and
maintaining geometric coordinates of the component of the source component and the target component that is bigger in size unchanged and varying geometric coordinates of the component of the source component and the target component that is smaller in size with respect to the bigger sized component in the CAD environment; and
when the source component and the target component have common topology, computing a set of assembly solutions for assembling the source component and the target component using common topology rules in the set of rules.

17. The non-transitory computer-readable storage medium of claim 13, wherein the instructions further comprise:

storing information associated with the geometric model comprising the assembled source component and target component in a model database.

18. The non-transitory computer-readable storage medium of claim 13, wherein each of the assembly solutions defines a constraint relationship between the source component and the target component.

* * * * *